United States Patent
Marler et al.

(10) Patent No.: US 6,565,314 B1
(45) Date of Patent: *May 20, 2003

(54) TURBINE AIR SEAL REPLACEMENT RINGS

(75) Inventors: Keith A. Marler, Houston, TX (US); Matthew C. Lau, Deer Park, TX (US); Shawn K. Smith, Kingwood, TX (US)

(73) Assignee: General Electric Company, Fairfield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/024,106

(22) Filed: Dec. 18, 2001

Related U.S. Application Data

(63) Continuation of application No. 09/518,012, filed on Mar. 2, 2000, now Pat. No. 6,422,815.

(51) Int. Cl.[7] ................................................ F01D 11/12
(52) U.S. Cl. .......................... 415/173.3; 415/173.5; 415/174.2; 415/174.5
(58) Field of Search .................... 415/170.1, 173.1, 415/173.3, 173.5, 174.5, 174.2; 277/355, 412, 420, 422

(56) References Cited

U.S. PATENT DOCUMENTS

| | | |
|---|---|---|
| 3,771,798 A | 11/1973 | McDonald et al. |
| 3,778,881 A | 12/1973 | Knapp |
| 3,846,899 A | 11/1974 | Gross |
| 4,028,788 A | 6/1977 | DeMusis |
| 4,285,108 A | 8/1981 | Arrigoni |
| 4,819,313 A | 4/1989 | Dadhich |
| 4,924,581 A | 5/1990 | Jakobsen |
| 5,099,564 A | 3/1992 | Lecointre et al. |
| 5,139,042 A | 8/1992 | Calhoun |
| 5,259,727 A | 11/1993 | Quinn |
| 5,609,469 A | 3/1997 | Worley et al. |
| 5,630,590 A | 5/1997 | Bouchard et al. |
| 5,704,614 A | 1/1998 | Sanders et al. |
| 5,735,045 A | 4/1998 | Papayoti |
| 5,961,279 A | 10/1999 | Ingistov |
| 6,027,121 A | 2/2000 | Cromer et al. |
| 6,030,175 A | 2/2000 | Bagepalli et al. |
| 6,139,019 A | 10/2000 | Dinc et al. |
| 6,422,815 B1 * | 7/2002 | Marler et al. ............ 415/173.3 |

* cited by examiner

Primary Examiner—Edward K. Look
Assistant Examiner—Richard A. Edgar
(74) Attorney, Agent, or Firm—Bracewell & Patterson LLP

(57) ABSTRACT

The knife edge air seal ring of a gas turbine is modified to receive a replacement or second seal ring portion having a wire brush seal. The replacement or wire brush air seal ring is mounted with the existing knife edge air seal mounting ring at a location so that the existing mounting ring may be used, while providing adequate strength and structural support for installation of the second, wire brush seal ring. The replacement seal ring may be provided with knife edge seals as well, if desired.

13 Claims, 3 Drawing Sheets

TURBINE AIR SEAL REPLACEMENT RINGS

The present application, is a continuation of application Ser. No. 09/518,012, filed Mar. 2, 2000, now U.S. Pat. No. 6,422,815.

BACKGROUND OF THE INVENTION

1. Field of the Invention

The present invention relates generally to turbine air seal rings.

2. Description of the Prior Art

Turbine blades of a gas turbine have employed a multiplicity of blades mounted around the peripheral portion of a rotatable disk. The disk rotated within an enclosed duct of a gas turbine under the drive forces of gases which have a high pressure and a high temperature. Air seals are required between the ducts and the circumferential rings formed by mating shrouds of the turbine disc to seal the gases in the turbines. The knife edge components which form the turbine air seals are relatively thin, typically on the order of 0.018 to 0.020 inches thick, and are typically formed from nickel based super alloys.

High temperature gases which pass over the turbine air seals cause the turbine air seals to wear or corrode. The thermal effects of combustion gas contaminants, the thermal stresses imposed by the cyclic nature of the operation of the turbine and the frictional engagement of the rotating disc against the stationary turbine outer air seal are some of the factors which cause damage to the air seals over time. A principal manifestation of the damage is an increase in the clearance gap between the seals and the disc. The increase in the clearance gap decreases the turbine efficiencies due to the power loss from escaping gases. In addition, turbine components which are heated by the escaping hot gases tend to deteriorate. A significant segment of turbine technology is directed to the repair of turbine air seals and the maintenance of air seal integrity.

Recently, one of the major turbine vendors, Westinghouse, has begun providing an air seal ring which uses wire brushes for sealing purposes. The wire brush air seals are provided in air brush rings. The wire brush air seals mounted in such rings have been asserted to increase cooling and efficiency. However, existing knife edge seal rings were not adapted to receive the new wire brush modifications. If an existing air seal ring was modified to receive the new wire brush ring, too much material from the existing ring had to be removed. There was inadequate structural support for the brush ring. Therefore, the existing ring had to be scrapped and a new replacement air seal purchased. The new replacement air seal was specifically sized to receive the wire brush ring with adequate support. However, the new replacement air seal was costly, and scrapping the entire prior existing ring to install a new ring fitted with the wire brush was wasteful and inefficient.

Other conventional turbine air seal repair technology involved machining of portions of the corroded damaged knife edge portions and the application of a weld build-up of the worn seal edges. The weldment was then remachined to the original specifications of the turbine component. However, considerable design and tooling efforts were frequently expended in controlling the distortion inherent in the welding process which caused some weld metal shrinkage and part distortion. Additional tooling was frequently provided to correct distortion where shrinkage otherwise could not be controlled. The design and tooling requirements for controlling distortion could often result in a repair process which was not cost effective in comparison with the cost of new replacement parts.

U.S. Pat. Nos. 4,285,108; 4,028,788; 3,771,978 and 4,924,581 dealt with techniques for removal and replacement of damaged areas of conventional knife edge seals. Typically new knife edge seals were installed in place of the damaged ones. However, this did not provide the increased cooling and efficiency of the wire brush seals.

SUMMARY OF THE INVENTION

The present invention relates to turbine air seal replacement rings, such as those used in gas turbines in power generation, electrical power plants or other electrical energy production facilities. A method for repairing or updating turbine air seal rings is also provided. The replacement air seal rings of the present invention provide a first seal ring portion having an annular groove formed therein, a second seal ring portion having a wire brush seal formed thereon and a mounting ring fitted into the annular groove of the first seal ring portion and being capable of receiving the second seal ring portion therein. The first seal ring portion may also have a plurality of knife edge seals formed thereon. The present invention also provides an adapter for repairing or converting a turbine air seal for use with a replacement seal ring. The adapter has a mounting ring for connecting a replacement wire brush seal ring to a knife edge seal ring of a gas turbine.

The gas turbine seal ring of the present invention provides a first seal ring portion having an inner wall from which a plurality of knife edge seals extend inwardly. The seals may be of any suitable number and dimension, as determined by the specific application for which the seal ring is used. An annular groove, channel or seat is formed in the first seal ring portion, the channel being capable of receiving a mounting ring therein. Typically, the annular groove is formed by milling or cutting material from a first seal ring portion of an existing seal ring.

The mounting ring provides an increased inner diameter to the air seal ring, thereby allowing installation of the new or improved second seal ring portion. The mounting ring is formed having an outer diameter or surface substantially conforming to the inner diameter or surface of the annular groove formed in the first seal ring portion. The mounting ring further has a generally rectangular cross sectional shape and may have at least one knife edge seal formed on an inner surface and extending inwardly therefrom. A cylindrical slot or seat is formed in the mounting ring, outwardly from the inner surface thereof. The slot partially defines an inner lip or edge of sufficient thickness to support and retain the second seal ring portion.

The second seal ring portion is securely fitted or mounted in the cylindrical channel formed in the mounting ring. A wire brush seal extends inwardly from the inner surface of the second seal ring portion, the wire brush seal being comprised of a plurality of relatively small bristle elements.

The adapter of the present invention provides a mounting ring for fitting into an annular groove in a knife edge seal ring and a replacement seal ring having a wire brush seal extending inwardly from an inner surface thereof. Depending on the specific application in which the adapter will be used, the mounting ring may have at least one or a plurality of knife edge seals extending inwardly from an inner surface. A cylindrical lip portion may be provided in the mounting ring for providing a support rim or shoulder for supporting and retaining the replacement seal ring, the lip extending between an inner surface and an annular slot or seat of the mounting ring.

The method of the present invention provides for first cutting or milling an annular groove or channel in the interior surface of the air seal ring. The milling process involves removing only a relatively small portion of material from the seal ring, sufficient to allow attachment of the mounting ring. The mounting ring is then fitted or installed into the groove and further then secured or attached to the air seal ring, thereby creating a modified or improved air seal ring.

DETAILED DESCRIPTION OF THE PREFERRED EMBODIMENT

Figure 1:
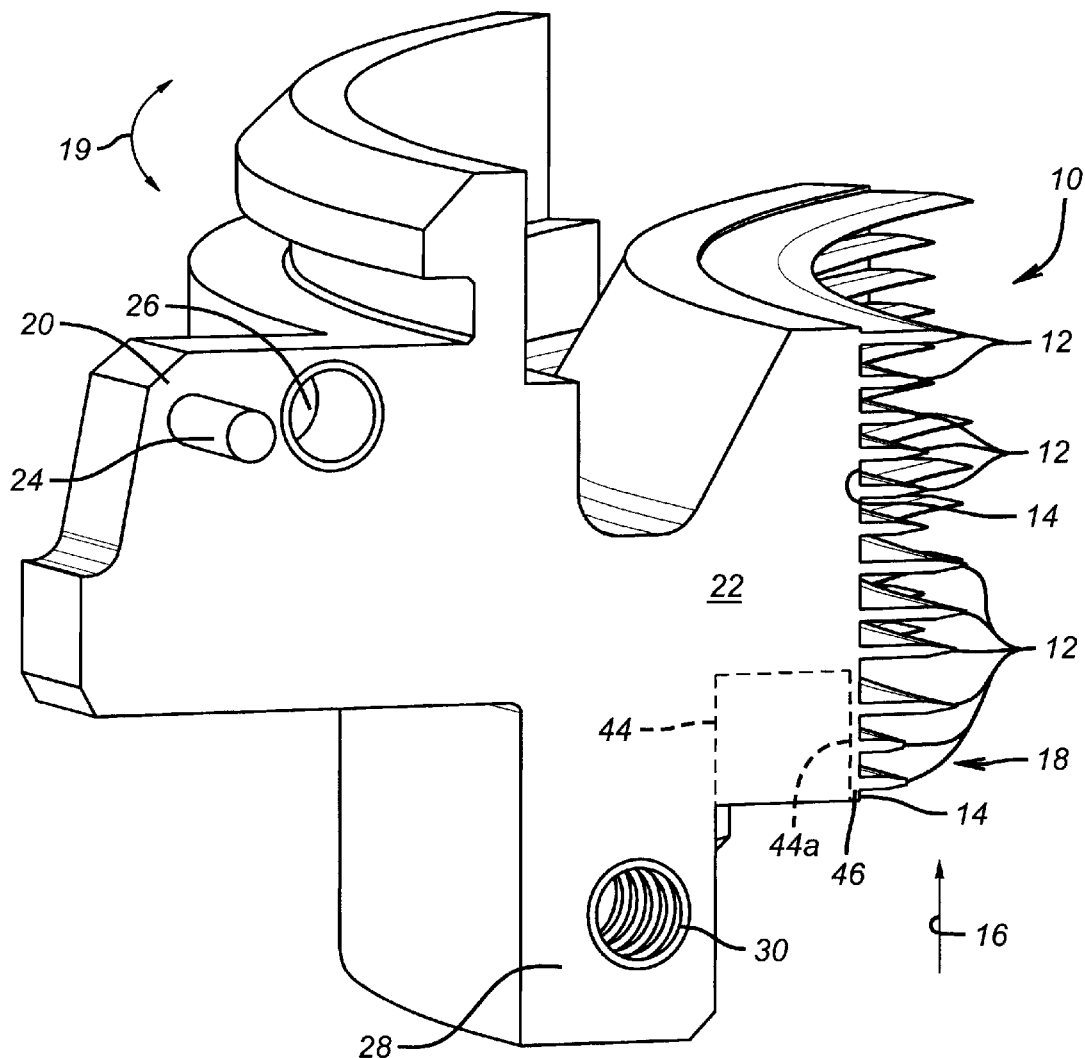
FIG. 1 is an isometric view of an end portion of an arcuate segment of a conventional knife edge seal ring of a gas turbine.

Referring now to FIG. 1, an air seal ring 10 of the conventional type having a plurality of inwardly extending knife edge seals 12 formed on a cylindrical inner wall 14 is shown. The air seal ring 10 is of the type used in gas turbines such as the Model W501D5 gas turbine units sold by Westinghouse Electric Corporation. The knife edges 12 seal, as is conventional, between ducts and mating shrouds of turbine disc on a rotor in the gas turbine. The air seal ring 10 is one of a series of such air seal rings in the gas turbine to confine the high pressure, high temperature gases to a desired flow pattern to impart drive force to the turbine rotor. The general direction of air flow through the turbine is indicated at 16, and the knife edges serve as mentioned to confine the air flow of such gases in a desired flow path. During the service life of the gas turbine, the knife edges 12, particularly those at an area 18 and closest to the incoming direction of general air flow tend to suffer wear, typically in the form of gaps or spacing between the knife edge seals 12 and the turbine blades, for reasons discussed above.

The air seal ring 10 shown in FIG. 1, is an arcuate segment of the conventional type known to those in the art which extends arcuately as indicated by an arrow 19. The amount of such extent is considerable, usually 180° and only a portion of the air seal ring 10 is shown. The air seal ring portion 10 is a component of circumferential ring formed by assembling together two segments like that shown in FIG. 1. The air seal ring is of a typical construction and has a mounting flange 20 formed extending radially outwardly from a shoulder or body portion 22. Further, the mounting flange 20 has a connector lug or pin 24 extending outwardly therefrom. A connector socket 26 is also formed in the mounting flange 20. The pin 24 and connector socket 26 are adapted to engage and fit with corresponding sockets and lugs, respectively, of the next adjacent arcuate segment in the circumferential air seal ring formed.

As is also conventional, the air seal ring portion 10 has a lower arcuately extending rim or shoulder 28 extending below the body portion 22 outwardly from the knife edges 12. The shoulder 28 has a threaded connector socket 30 formed in it for receipt of a connector, such as a bolt or the like, to assembly the air seal ring portion 10 with other such seal ring portions to form the circumferential seal ring of knife edges 12. The seal ring 10 is conventional and other structural features shown not necessary for an understanding of the present invention are not described.

Figure 2:
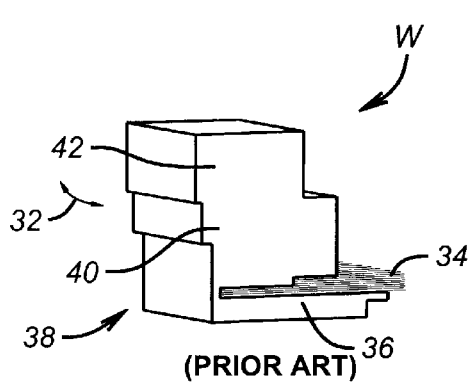
FIG. 2 is an isometric view of an end portion of an arcuate segment of a wire brush seal ring.

FIG. 2 in the drawings shows a wire brush air seal ring W of the type recently introduced by Westinghouse Electric Corporation. One particular model of such an air seal ring is that available from Westinghouse Electric Corporation as a Row 3 air seal for a 501D5 turbine. The wire brush seal ring W is shown, as is the case with air seal ring 10 of FIG. 1, in an end view of an arcuate segment extending arcuately, as indicated by an arrow 32. The typical arcuate extent of the seal ring W is comparable to that of the seal ring 10 and thus only a portion is shown. The wire brush seal ring W has an inwardly extending wire brush seal segment 34 formed of multiple, closely packed metal wires, which at their inner ends individually contact with rotor structure and seal therewith in the gas turbine. The multiple contacts with the rotor structure by the inwardly extending wire brush seal segments 34 are said to afford increased efficiency and cooling over that provided by the individual knife edge seal rings of the type shown in FIG. 1. The brush seal segments 34 are mounted in a lower segment 36 of a mounting ring 38 which also includes an intermediate body portion 40 and an upper connector rim 42. The mounting body 40 for brush seal segment 34 has dimensions and size determined by structural integrity considerations based on rotational speed and other factors. These dimensions cannot be reduced below a specified or established minimum. Thus, for a particular gas turbine seal ring, the upper connector rim 42 has specified dimensions which cannot safely be reduced.

Turning again to FIG. 1, a phantom line 44 depicts the border of a cross-sectional area of the air seal ring 10 which would need to be removed to accommodate the connector rim 42 of the mounting body 40 for the brush seal segment 34. As can be seen, only a very thin wall portion 46 between an inner border 44a of the phantom line 44 and an inner wall 14 where knife edge seals 12 are formed. This wall portion 46 afforded inadequate strength and support, and it was thought necessary therefore to scrap or discard the existing air seal ring 10 and purchase an entire new air seal ring, especially designed and structurally adapted for fitting of the wire brush seal ring W. As has been set forth above, this approach was expensive and could be considered wasteful and uneconomic.

Figure 3:
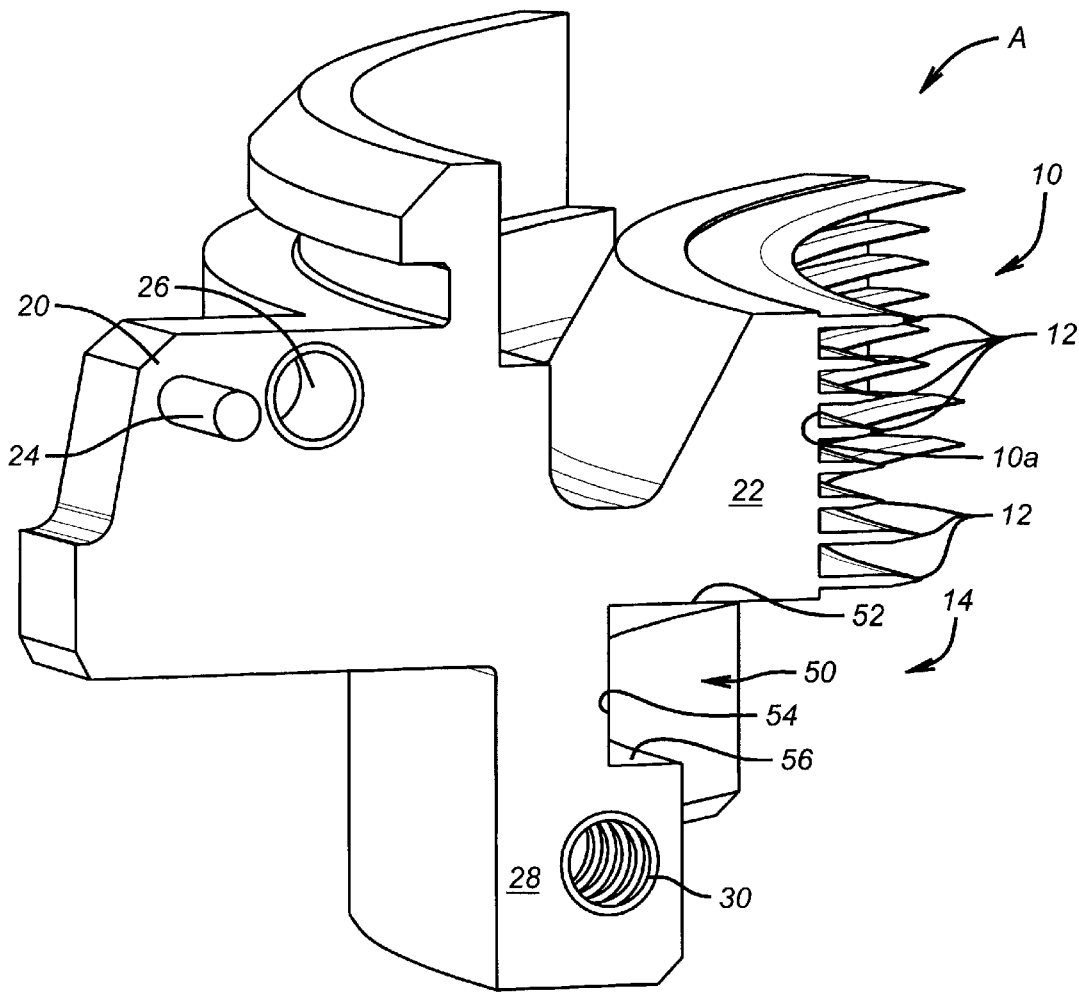
FIG. 3 is an isometric view of the seal ring structure of FIG. 1, modified according to the present invention.

FIG. 3 shows the initial structural element of an air seal ring A according to the present invention. The initial structural element of FIG. 3, is formed by modifying the knife edge air seal ring 10 shown in FIG. 1, and accordingly like structure FIG. 1 and FIG. 3, bears like reference numerals. A number of existing knife edge seals 12 of the knife edge seal 10 of FIG. 1, remain extending inwardly from an inner upper surface 10a of the first seal ring portion 10 in the structure shown in FIG. 3, as can be seen. An annular groove, channel or seat 50 is cut or milled into the shoulder or body portion 22 using any suitable process, the channel 50 being formed adjacent an upper surface 52 and a rear or outer surface 54 in the body portion 22. A lower surface 56 is formed in the rim or shoulder 28 below the annular groove 50. The formation of channel 50 typically includes the removal of a number of knife edge seals 12 in the area 14. However, these knife edge seals are typically the ones more likely to be damaged or worn during service use. Thus, the present invention enables these potentially damaged or worn knife edge seals to be replaced while also accommodating the additional sealing function of the wire brush seal W of FIG. 2.

Figure 4:
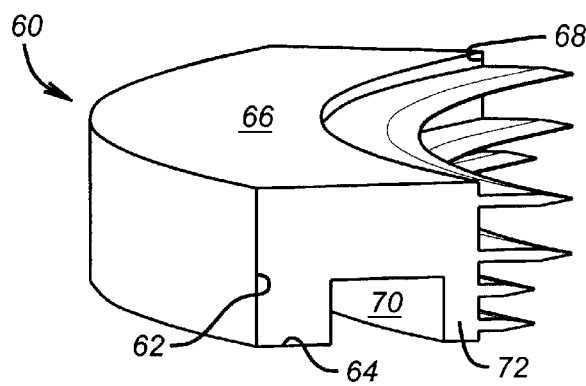
FIG. 4 is an isometric view of an end portion of a mounting ring adapter according to the present invention.

In order to mount the wire brush seal W (FIG. 2) to the knife edge seal ring 10, (FIG. 3) and form the air seal ring A of the present invention, a mounting ring 60 (FIG. 4) is provided. The mounting ring 60 is cylindrical and has a generally rectangular cross-sectional shape. The mounting ring 60 is formed to fit within the annular channel 50 formed in the knife edge seal ring 10 of FIG. 3. The mounting ring 60 is typically formed of a comparable material, for example a super alloy known as 2¼ chrome 1 moly, to that of the mounting body 50 and seal ring. The mounting ring 60 has dimensions in conformance with those of the channel 50. The mounting ring 60 may be attached to the body 22 of seal ring 10 by any suitable connecting mechanisms, but is preferably attached using a suitable number of circumferentially spaced, countersunk screws or bolts. These connectors extend upwardly through ports in the ring 60 into tapped sockets in the body portion 22 above channel 50. The mounting ring 60 has an outer surface 62 conforming to fit against the outer surface 54 formed against channel 52. The mounting ring 60 also includes a lower surface 64 adapted to fit against, and preferably of like dimensions to, the lower surface 56 in the shoulder 28. The mounting ring 60 also includes an upper surface 66 extending inwardly from surface 62. The upper surface 66 is adapted to fit against upper surface 52 formed in body portion 22 and extends inwardly to an inner surface 68 which is oriented in a plane parallel to the inner surface 10a of the first seal portion 10.

Figure 5:
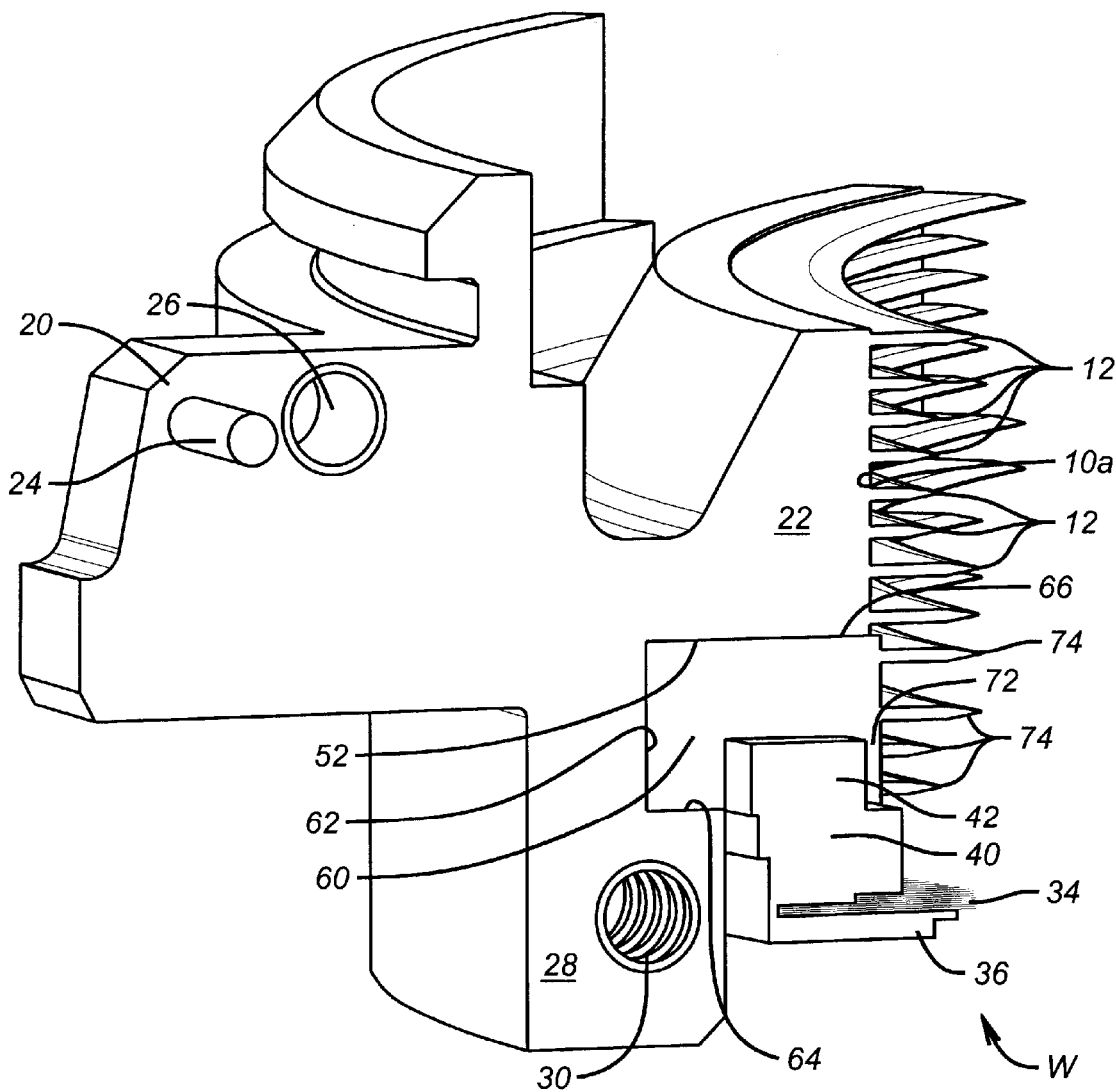
FIG. 5 is an isometric view of an end portion of a seal ring for a gas turbine according to the present invention.

The mounting ring 60 preferably has an annular slot or seat 70 formed extending upwardly above the surface 64. The slot 70 is of dimensions capable of receiving the connector rim 42 of the brush seal segment 34. However, with the present invention, the mounting ring 60 has an inner lip portion 72 extending inwardly (FIG. 5) beyond an inner diameter of the surface 10a of the first seal ring portion 10. In this manner, the lip portion 72 forms a support shoulder for the mounting ring 60. The thickness of the support shoulder by lip portion 72 is selected to meet the structural requirements for the particular seal ring and is not limited to the reduced area 46 shown in FIG. 1.

The mounting ring 60 when fitted (FIG. 5) in the annular groove 70 in the first seal ring portion 10 extends inwardly at lip 72 a greater distance than the inner wall 10a of the first seal ring portion 10, providing additional support and strength. The lip 72 so formed affords sufficient material and thickness to support and retain the mounting body 40 of brush seal segment 34 of the wire brush seal W in place during service use. The mounting body 40 may be attached to the mounting ring 60 in a like manner to the attachment of ring 60 to seal ring 10 described above. It is to be noted that the mounting ring 60 preferably has one or more knife edge seal members 74 disposed extending inwardly from the inner surface 68. Preferably, the mounting ring 40 has a number of knife edge seals 74 formed on the mounting ring 60 to correspond to the number of knife edge seals removed when the annular channel 50 was formed. This permits addition of the wire brush seal W without reduction in the number of knife edge seals.

After the mounting ring 60 is secured to the first seal ring portion 10 and the wire brush mounting ring 40 attached, the improved and more efficient air seal ring A (FIG. 5) of the present invention is formed. The air seal ring A may have number of knife edge seals as the original air seal ring 10 of FIG. 1. In addition, the air seal ring A has an improved wire brush seal segment 34 capable of providing a more efficient seal.

The foregoing disclosure and description of the invention are illustrative and explanatory thereof, and various changes in the size, shape and materials, and components, as well as in the details of the illustrated construction may be made without departing from the spirit of the invention.

What is claimed is:

1. A seal ring for a gas turbine, comprising:
   a first seal ring portion having a plurality of knife edge seals formed extending inwardly from an inner wall thereof;
   a second seal ring portion having a wire brush seal formed extending inwardly therefrom;
   the first seal ring portion having an annular groove formed therein;
   a mounting ring fitted in the annular groove of the first seal ring portion and including at least one knife edge seal member extending inwardly therefrom; and
   the mounting ring having the second seal ring portion filled therein.

2. The gas turbine seal ring of claim 1, wherein:
   the mounting ring fitted in the annular groove of the first seal ring portion includes a plurality of knife edge seal members extending inwardly therefrom.

3. The gas turbine seal ring of claim 1, wherein:
   the mounting ring fitted in the annular groove of the first seal ring portion includes a lip portion extending inwardly beyond an inner diameter of the first seal ring portion to form a support shoulder for the second seal ring.

4. The gas turbine seal ring of claim 3, wherein:
   the mounting ring fitted in the annular groove of the first seal ring portion has a cylindrical slot formed outwardly from the lip for fitting of the second seal ring portion therein.

5. The gas turbine seal ring of claim 1, wherein:
   the mounting ring fitted in the annular groove of the first seal ring portion extends inwardly a greater distance than the inner wall of the first seal ring portion.

6. An adapter for a knife edge seal ring of a gas turbine, comprising:
   a replacement seal ring having a wire brush seal formed extending inwardly therefrom;
   a mounting ring for fitting into an annular groove of the knife edge seal ring and including at least one knife edge seal member extending inwardly therefrom; and
   the mounting ring having the replacement seal ring fitted therein.

7. The adapter of claim 6, wherein:
   the mounting ring includes a plurality of knife edge seal members extending inwardly therefrom.

8. The adapter of claim 6, wherein:
   the mounting ring includes a cylindrical lip portion forming a support shoulder for the replacement seal ring.

9. The adapter of claim 8, wherein:
   the mounting ring extends inwardly a greater distance than the inner wall of the first seal ring portion.

10. The adapter of claim 8, wherein:
    the mounting ring has a cylindrical slot formed outwardly from the lip for fitting of the second seal ring portion therein.

11. A mounting ring for connecting a replacement wire brush seal ring to a knife edge seal ring of a gas turbine comprising:

a cylindrical ring member for fitting into the knife edge seal ring;

the cylindrical ring member having an annular slot formed therein for receipt of the replacement wire brush seal ring therein; and at least one knife edge seal member formed on the mounting ring extending inwardly therefrom.

12. The mounting ring of claim 11, wherein:

the mounting ring includes a plurality of knife edge seal members extending inwardly therefrom.

13. The mounting ring of claim 11, including:

a cylindrical lip portion extending inwardly of the annular slot forming a support shoulder for the replacement seal ring.

* * * * *